United States Patent [19]
Bood

[11] Patent Number: 5,229,676
[45] Date of Patent: Jul. 20, 1993

[54] ELECTRIC MACHINE WITH SELF-CONTAINED SPARE BEARING

[76] Inventor: Louris Bood, Rodenrijseweg 525, 2651 Ar Berkel en Rodenrijs, Netherlands

[21] Appl. No.: 768,574
[22] PCT Filed: Apr. 19, 1990
[86] PCT No.: PCT/NL90/00050
  § 371 Date: Sep. 21, 1991
  § 102(e) Date: Sep. 21, 1991
[87] PCT Pub. No.: WO90/13937
  PCT Pub. Date: Nov. 15, 1990

[30] Foreign Application Priority Data
May 1, 1989 [NL] Netherlands .......................... 8901095

[51] Int. Cl.$^5$ ..................... H02K 16/00; H02K 5/16
[52] U.S. Cl. ..................... 310/114; 310/90; 384/559
[58] Field of Search ............... 29/402.08, 598, 898.01; 310/90, 112, 114; 384/102, 445, 548, 559, 569, 587, 624, 627

[56] References Cited
U.S. PATENT DOCUMENTS

| | | |
|---|---|---|
| 1,654,774 | 1/1928 | Arutunoff . |
| 3,407,680 | 10/1968 | Westmoreland ..................... 310/112 |
| 3,917,363 | 11/1975 | Korting . |
| 4,425,010 | 1/1984 | Bryant et al. ....................... 384/624 |
| 4,690,574 | 9/1987 | Green ................................... 384/569 |
| 5,040,907 | 8/1991 | Harvey ................................ 384/548 |

FOREIGN PATENT DOCUMENTS

| | | | |
|---|---|---|---|
| 1329624 | 10/1963 | France . | |
| 1495921 | 7/1989 | U.S.S.R. ............................... | 310/90 |

OTHER PUBLICATIONS 2 pages of International Search Report (Jul. 1990).

Primary Examiner—Steven L. Stephan
Assistant Examiner—Ed To
Attorney, Agent, or Firm—Young & Thompson

[57] ABSTRACT

An electric machine has self-contained spare bearings located between two or more rotors and mounted on a common shaft consisting of one piece. The spare bearings are fixed on a shaft bush by their respective inner rings, and slid into a position adjacent to the original bearings between each rotor driving the common shaft. Upon the failure of the original bearings, the spare bearings are slid into the position of the original bearings, thereby allowing the electric machine to continue to operate.

3 Claims, 1 Drawing Sheet

ELECTRIC MACHINE WITH SELF-CONTAINED SPARE BEARING

FIELD OF THE INVENTION

The invention relates to an electric machine, comprising two or more rotors arranged coaxially on a common shaft at a distance from each other, each of which is disposed inside a respective stator, a ball or roller or magnetic bearing being disposed between each two adjacent rotors in order to support the rotary parts relative to the stationary part of the machine, both rotors and stators being excitable simultaneously or in succession.

BACKGROUND OF THE INVENTION

Such a machine is in fact known in practice, for instance from U.S. Pat. No. 1,654,774. In that case, for example, a number of electric motors are, as it were, connected in series.

The use of a number of smaller motors or generators instead of one large motor has many advantages.

By, for example, starting the motors after one another, the very high starting currents used in large motors, which would require a very large transformer and generator, are avoided.

Moreover, smaller motors can be supplied as standard models and are therefore much cheaper than a specially manufactured larger motor.

The machine made up of several motors or generators also takes up much less space than one large machine.

The rotors of the various machines are in practice fixed by means of hollow shafts or the like on the common shaft, in order to permit fitting and removal.

Ball or roller bearings are provided between the rotors. Although these currently have a long service life, they still have a limited one. The use of hollow shafts means that it is possible to remove them after wear and replace them with new bearings. The design with hollow shafts is, however, complex.

SUMMARY OF THE INVENTION

The electric machine according to the invention is characterized in that the inner ring of each bearing is fixed on a respective shaft bush which can be slid along the shaft during repairs and which can be fixed relative to the shaft, and in that one or more bearings for use as spares are located on each, shaft bush.

Although roller bearings made up of two halves do exist, they cannot be used here, on account of the very limited maximum speeds of rotation permitted for them, which do not correspond to those of electric motors and generators.

BRIEF DESCRIPTION OF THE DRAWINGS

The invention will be explained in greater detail with reference to the sole drawing, in which a longitudinal section through an electric machine according to the invention, in particular a motor, is shown, said machine being made up of three smaller machines.

DETAILED DESCRIPTION OF THE INVENTION

Figure 1:
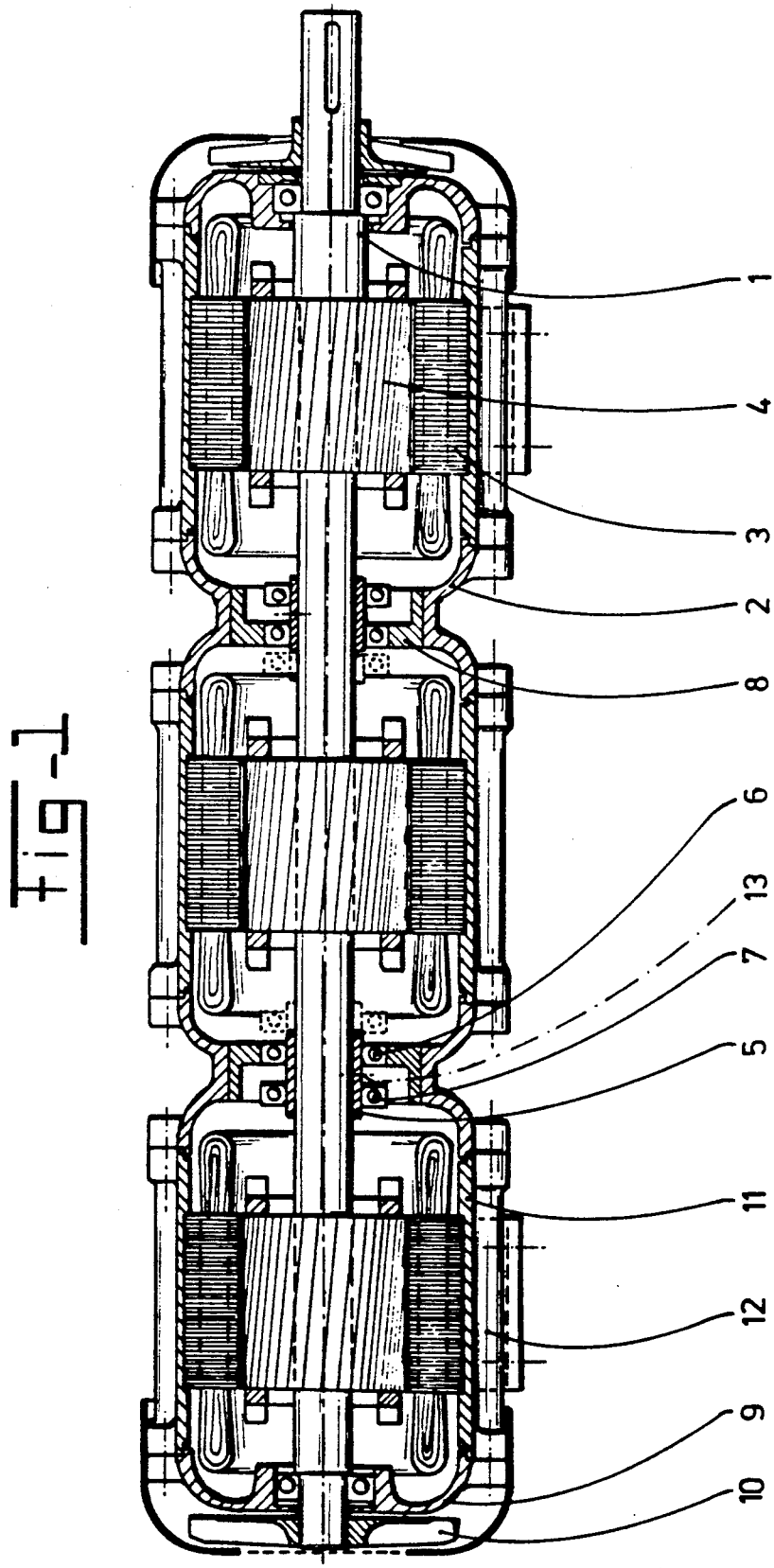

The common shaft, consisting of one piece, is indicated by 1, the specially manufactured intermediate cover by 2, the stators by 3, the rotors by 4, said rotors being shrunk on the shaft 1, the shaft bush by 5, the working ball bearing by 6, one of the spare bearings by 7, the bearing housing by 8, the end bearing cover by 9, the cooling air fan by 10, the stator housing by 11, and one of the cooling fins by 12.

After the first rotor 4 has been pressed onto the shaft 1, a shaft bush 5 is slid over the shaft 1 with two or more ball bearings on it.

This thus slidable shaft bush 5 is retained on the shaft 1 by means of an adjusting screw 13 or the like in such a way that one of the bearings on the outer ring is enclosed by the non-rotating housing part.

Only then is the next rotor pressed onto the shaft, and so on.

When in due course the above-mentioned ball bearing is ready for replacement, the shaft bush 5 with the other not yet loaded, spare, bearings on it is slid along the shaft to the position previously occupied by the worn bearing. The latter then remains sitting uselessly on the shaft bush, but cannot cause any further harm.

It is theoretically possible to calculate the service life of a ball bearing, but the wear phenomens are generally noticeable from an increasingly loud hum. In this way, the bearings can be slid along in time.

An electric machine according to the invention can be made up of standard parts (see, for example, IEC Standards DIN 42673/42677). No special measures are needed to achieve the machine according to the invention.

I claim:

1. An electric machine, comprising at least two rotors arranged coaxially on a common shaft consisting of one piece, at a distance from each other, each of which rotors is disposed inside a respective stator, a bearing being disposed between two adjacent rotors in order to support the shaft and rotors relative to the stators, wherein the bearing has an inner ring which is fixed on a shaft bush which can be slid along the shaft during repairs, and which bush can be slid along and fixed relative to the shaft, when the bearing is worn out, so as to relieve the bearing from supporting the shaft and rotors, there being a bearing for use as self-contained spare located on said shaft bush that slides along the shaft with the bush to occupy the position previously occupied by the worn bearing.

2. An electric machine according to claim 1, wherein said electric machine is comprised of three rotors arranged coaxially on a common shaft and a self-contained spare bearing disposed between the adjacent rotors.

3. An electric machine according to claim 1, wherein said bearing has an outer ring on which said bearing is supported by a bearing housing, which bearing housing projects outward in a radial direction to support a stator housing between two adjacent rotors.

* * * * *